June 26, 1934.  C. A. SHIPPLING  1,964,691
APPARATUS FOR TREATING KNIT GOODS
Filed Aug. 1, 1928  4 Sheets-Sheet 1

INVENTOR
Charles A. Shippling
By
Ernest Hopkinson
ATTORNEY

June 26, 1934.   C. A. SHIPPLING   1,964,691
APPARATUS FOR TREATING KNIT GOODS
Filed Aug. 1, 1928   4 Sheets-Sheet 2

INVENTOR
Charles A. Shippling
By
ATTORNEY

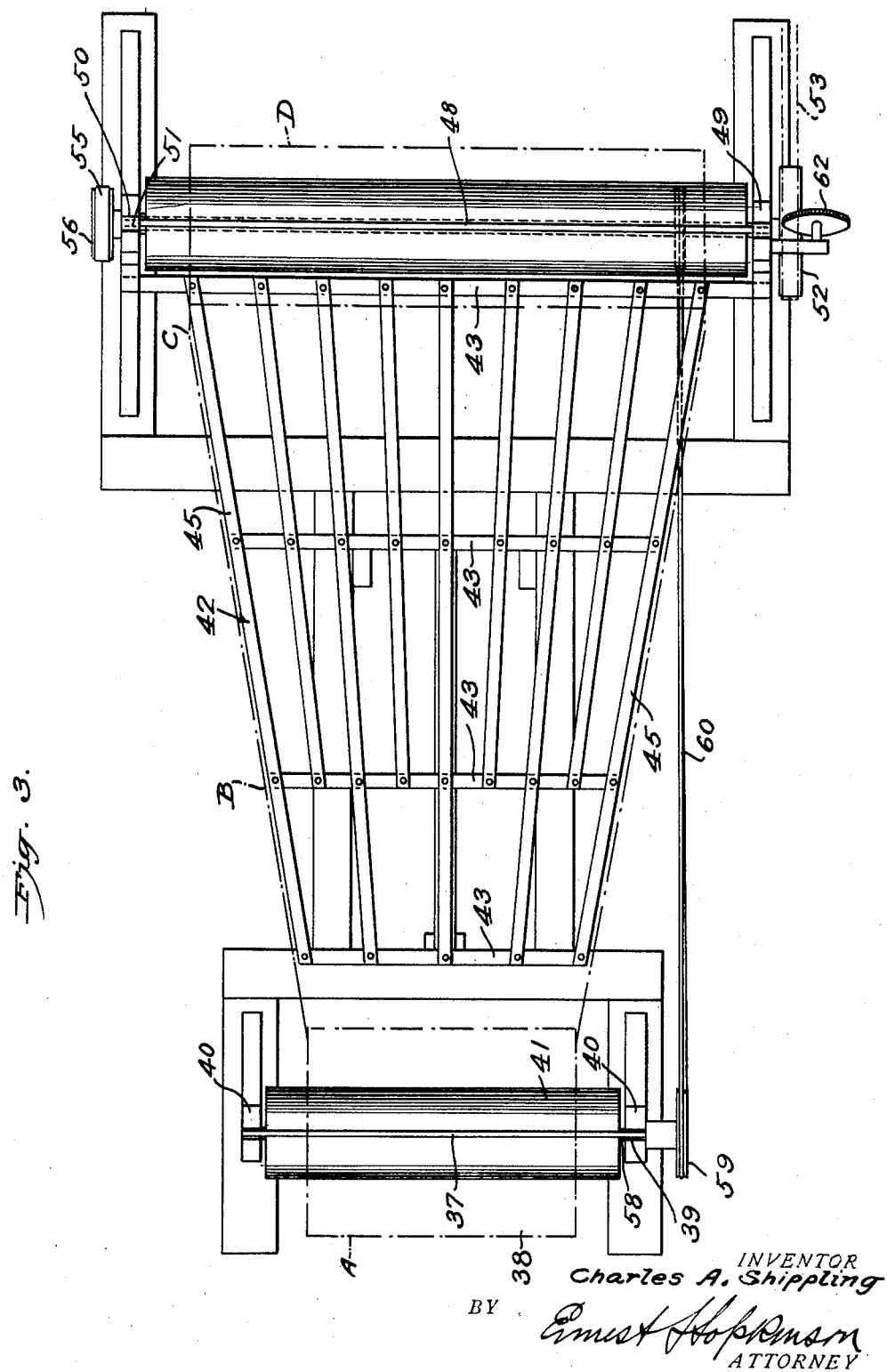

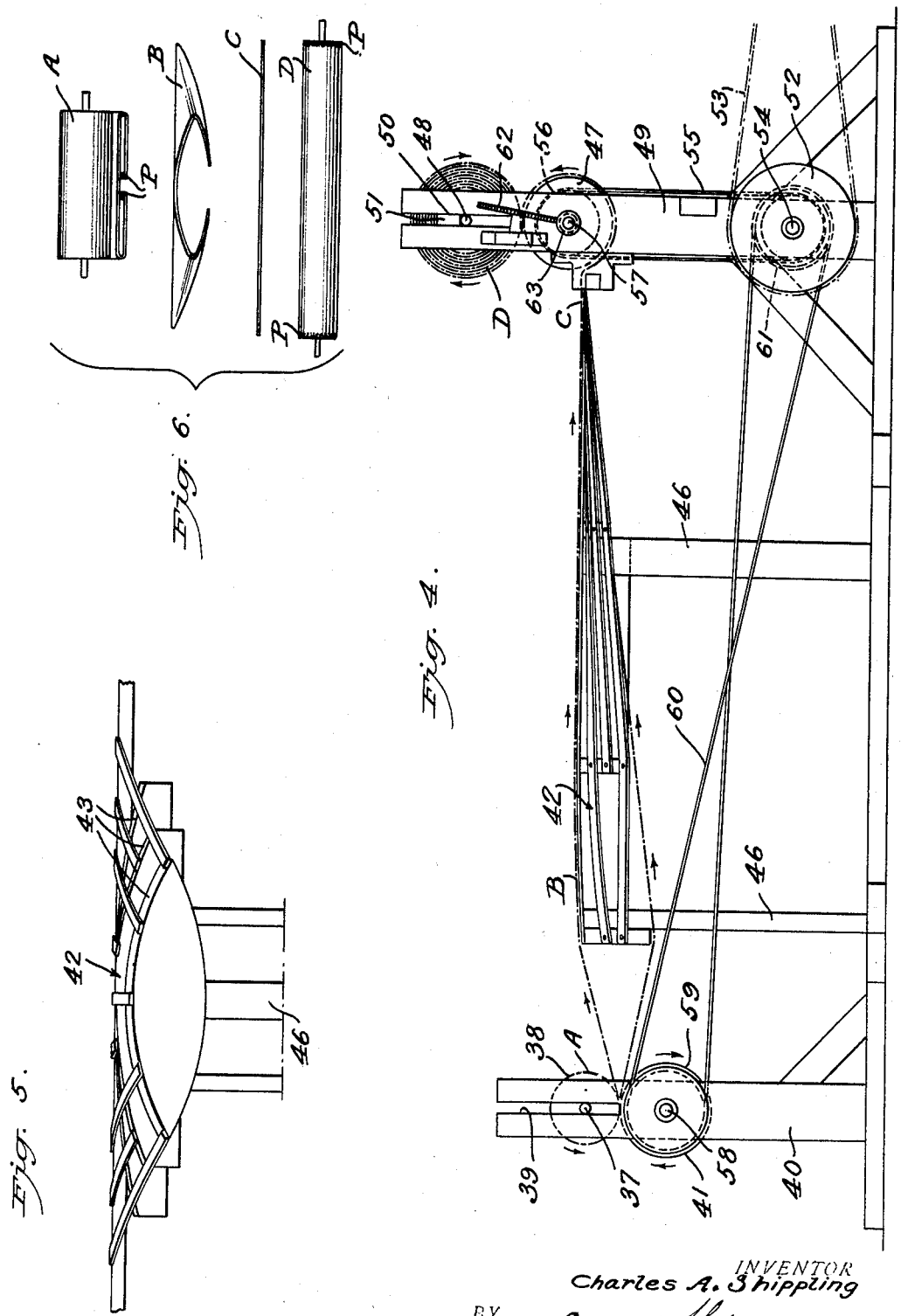

Patented June 26, 1934

1,964,691

UNITED STATES PATENT OFFICE 1,964,691

APPARATUS FOR TREATING KNIT GOODS

Charles A. Shippling, Kitchener, Ontario, Canada, assignor, by mesne assignments, to The Goodyear's India Rubber Glove Manufacturing Company, Naugatuck, Conn., a corporation of Connecticut Application August 1, 1928, Serial No. 296,685

8 Claims. (Cl. 91—14)

This invention pertains to a method and means for forming from a tube of knit goods, a strip thereof having non-curling margins.

Knit goods which is to be made into various articles is generally woven in tubular form and then slit lengthwise of the tube so as to form a strip. When such a strip of goods is to be coated with rubber, it is run through a calendering machine which necessarily applies considerable tension lengthwise of the goods during application of the rubber, and this causes the side edges of the goods to curl, making the goods difficult to handle and sometimes results in spoiling. It has been found that if the side margins of the strip of knit goods are provided with paste, the margins do not curl and the goods can be handled to the best advantage. Heretofore, such pasting has been done by placing a length of tubular goods on a heated pipe, applying a stripe of paste, and then slitting by hand with a knife when the paste dried. The goods then required rehandling by two workmen to either roll it or place it in some other suitable form for further manipulation. For the foregoing and other reasons, hand pasting and slitting is not entirely satisfactory.

One object of this invention is to provide an apparatus for continuously advancing the tubular goods lengthwise thereof, applying a stripe of paste to the advancing goods, drying the stripe, continuously slitting the tube intermediate the stripe of paste, and then accumulating the strip of goods thus formed into convenient form for subsequent handling. This latter step preferably consists in winding into a roll. As a result of this continuous operation, production is greatly increased, a more perfect product is obtained and there need be only one workman.

Other objects and advantages will appear as the description proceeds.

Reference is to be had to the following specification and accompanying drawings in which:—

Fig. 3 is a plan of a spreader for the slit and pasted tube;

Fig. 4 is a side elevation of the spreader;

Fig. 5 is a detail of a portion of the spreader; and

Fig. 6 is a developed view of the steps of operation.

Figure 1:
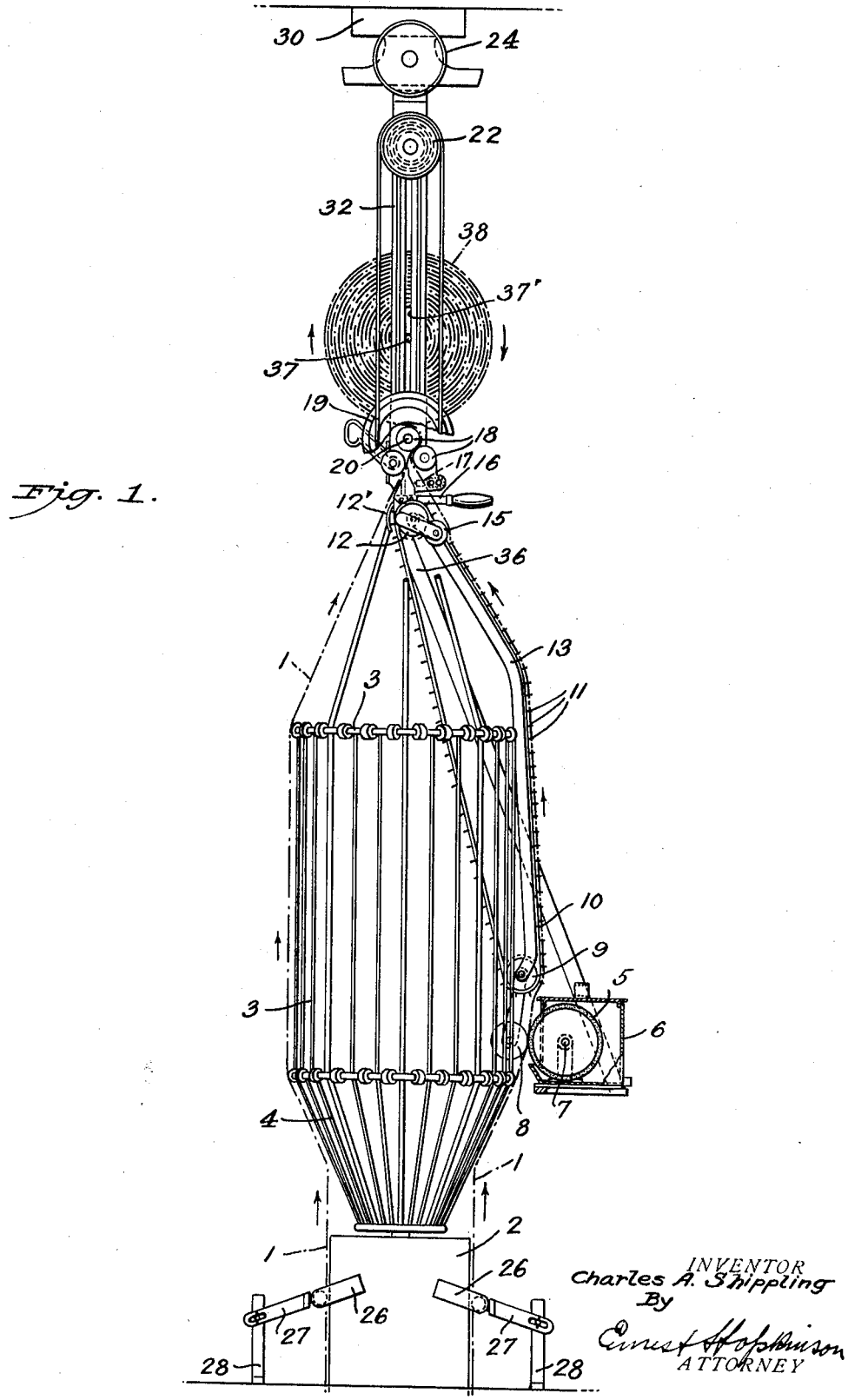
Fig. 1 is a side elevation of a portion of the apparatus operating upon the tubular goods.
Figure 2:
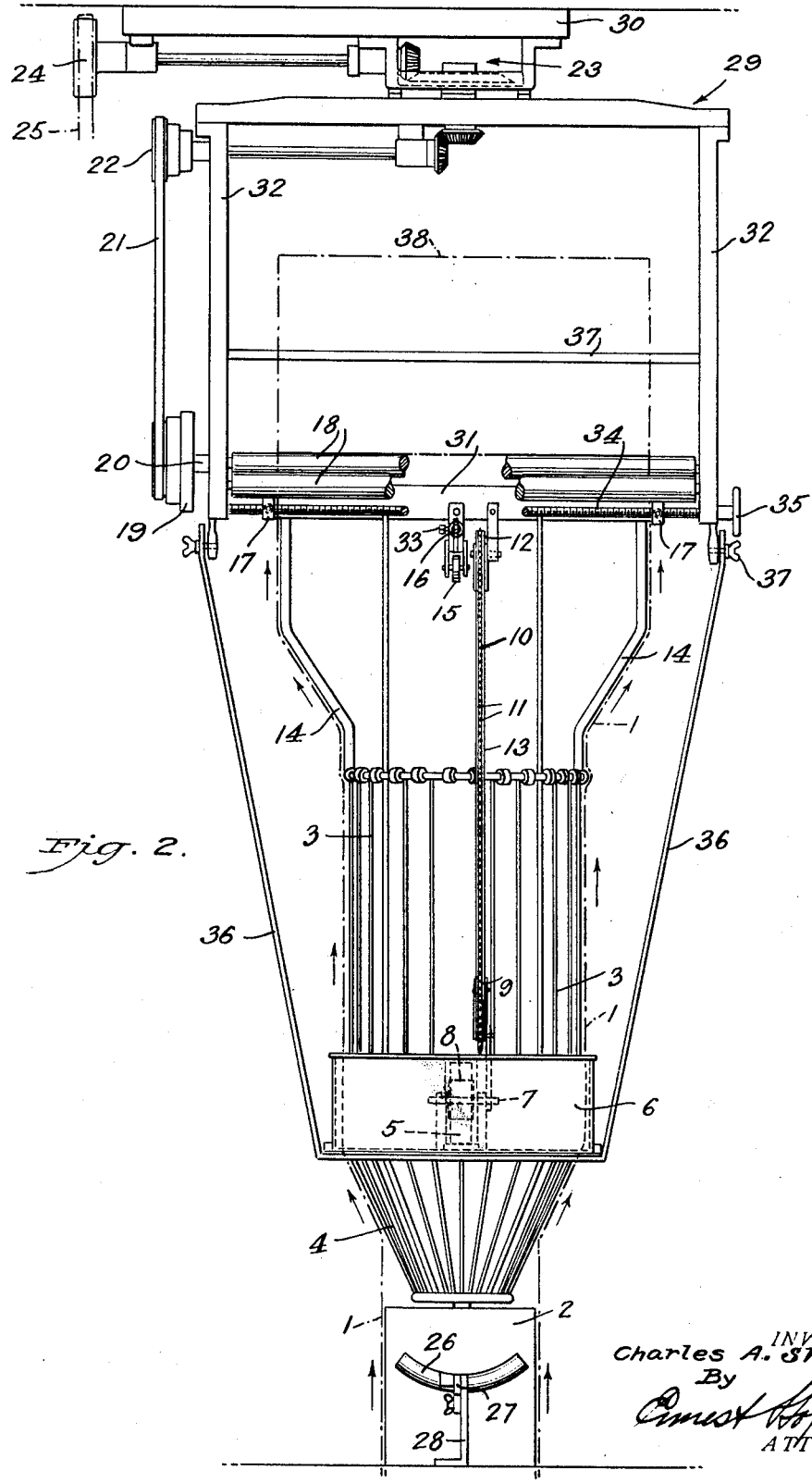
Fig. 2 is a front elevation thereof.

In the accompanying drawings, reference character 1 indicates a tube of knit goods which is fed upwardly in the direction of the arrows around a drier pipe 2 from a source usually on a lower floor from the upper end of the drier pipe 2. A blast of heated air is constantly driven through the drier pipe 2 so as to heat and dry the rising tubular fabric 1, as will be readily understood by those familiar with the art. The tube 1 rises around a drier cage 3 which has a converging cone-shaped lower portion 4 which enters the tubular fabric adjacent the top of the pipe 2 and gradually stretches the fabric 1 while drying, in order to obtain proper size in the finished goods. As the tube 1 advances upward beyond the stretching zone, a paste applying wheel 5 engages a portion of the circumference of the tubular fabric 1 and continuously applies paste thereto, so that a stripe of paste is formed on the tube as it advances upward over the cage 3. The paste applying wheel may be contained in a receptacle 6 and journalled in suitable bearings 7 whereby the pasting wheel 5 rotates freely in contact with the rising tube 1. A wheel 8 on the inside of the tube is adapted to form a revolving backing against the inner surface of the tube opposite the paste applying wheel 5 to aid the latter in applying the stripe. As the tube 1 rises beyond the paste applying wheel 5, a chain 10 has a series of pins 11 which engage the goods so as to guide the stripe in a substantially straight line as it rises along the drying cage 3. The upper end of the chain 10 runs over a pulley 12, and the chain is preferably guided in a suitably supported channel member 13. The upper pulley 12, the lower pulley 9 and the backing wheel 8 are conveniently journalled in the member 13. As the goods reaches the upper part of the drier cage 3, a pair of outwardly converging supports 14 at opposite sides of the tube 1, effect gradual flattening thereof. As the tube 1 approaches the pulley 12 at the top of the chain 10, a small roller 15 engaging the tube from its inside wall lifts the tubular goods 1 from the pins 11. A shield 12' adjacent the wheel 12 prevents the pins 11 from engaging the opposite wall of the tube 1. Immediately after lifting the pins, a knife 16 engages the tube 1 and slits the same intermediate the pasted stripe which has been dried on the cage 3 through the agency of the drier pipe 2. As the goods advances upwardly beyond the slitting knife 16, a pair of oppositely disposed guides 17 engage the flattened tube and guide it during further progress upwardly between a pair of feed rolls 18 which are driven by a pulley 19 on a shaft 20 of one of the feed rolls 18, through the medium of a belt 21 running upon a pulley 22 which is driven through a series of suitable connections 23 by a driving pulley 24 connected to a source of power by a belt 25.

Sometimes the tubular goods 1 in coming up around the drier pipe 2 contains folds or creases which if allowed to remain may cause difficulties in properly drawing the tube up around the drier cage 3 and to receive the paste. In order to overcome any disadvantage arising from this cause, there is provided a smoothing device which is preferably in the form of a pair of oppositely disposed inflated rubber tubes 26, arcuate in form and adapted to engage the rising tube and smooth out folds or wrinkles. It is clear that folds or other unevenness of the goods in the line of the paste wheel would seriously interfere with its operation and result in spoilation of that section of the goods. The rubber tubes 26 yield sufficiently to prevent crushing any wrinkles into the cloth, and are provided with arms 27 which have adjustable connection to vertical supports 28 which may be secured directly to floor adjacent the drying pipe 2. The driving mechanism, that is, the pulleys 24, 22 and 20, connections 23 and the feed rolls 18, are preferably mounted in a frame designated generally 29 which is attached to the ceiling of the room by means of a cross member 30 and suitable bolts. The knife 16 and the channel member 13 are preferably secured to a cross bar 31 between the side members 32 of the frame 29, the knife being removable and held in its cutting position by means of a set screw 33 so that it may be removed at any time for the substitution of another knife. The guides 17 are also supported in the ends of the side members 32 of the frame 29 by means of a threaded bar 34 having right and left hand threads which is rotated by means of a hand wheel 35 so as to move the guides 17 either inward or outward with respect to the side edges of the flattened tube 1.

For supporting the paste receptacle 6, a pair of straps 36 suitably fastened to the container are connected at their upper ends to the lower portions of the side members 32 by means of wing screws 37, or in any other desirable manner.

After the tube has been advanced above the feed rolls 18, it is wound upon a windup bar 37, to which one end of the tube had been fastened as a preliminary to starting the machine in operation. The windup bar 37 is preferably mounted in slots 37' in the side members 32. The tube is wound up by resting the bar 37 with the goods therearound upon the upper one of the feed rolls 18, and the weight of the goods itself holds it in frictional contact with said roll 18. Also, weights may be used at the ends of the bar. In this way the slit goods is continuously wound into a roll, as indicated at 38. The roll of goods 38 is now in double ply form, and slit lengthwise intermediate the stripe of paste, whereby two pasted margins are formed.

The roll 38 is then removed with the windup bar and placed in the apparatus illustrated in Figs. 3 and 4. The windup bar 37 being journalled in slots 39 of uprights or standards 40, and rests upon an unwinding roll 41. As the double ply goods unwinds, it advances over an opening and spreading table 42 which is preferably a frame work comprising a series of cross members 43 and longitudinal members 45 presenting outwardly converging side edges to the split tube 1 so that as it advances along the table 42, the pasted side margins of the tube are gradually thrust in opposite directions and the tube thus opened into substantially flat form with its pasted side margins outermost. The table 42 may be conveniently supported on uprights 46.

After the tube has been fully spread apart so as to form a flat strip of fabric, it travels around a sand covered roller 47 and then is wound up on a bar 48 which is journalled in standards 49 having a slot 50 in which the bar 48 may move up as the roll increases in size, and a weight 51 may be provided at the opposite ends of the bar 48 so as to aid in holding the roll against the roller 47. The sand covered roller 47 may be driven in any suitable manner. In the present example of the invention, a pulley 52, driven by a belt 53 revolves a shaft 54 journalled in the standard 49, and a belt 55 drives a pulley 56 connected to the shaft 57 of the sand covered roller 47. The sand covered roller 47, the bar 48, and the driving pulley 52 constitute the means for causing the tubular fabric to advance over the opening and spreading table 42, the leading end of the tubular fabric having been connected to the bar 48 as a preliminary to starting the machine in operation. In order to aid the sand covered roller 47 in advancing the goods across the table 42, means are provided for positively rotating the unwinding roller 41. This may consist in providing the shaft 58 of the roller 41 with a pulley 59 and driving the same by means of a belt 60 running over a similar pulley 61 mounted on the shaft 54.

In Fig. 6 the letter A represents knitted goods formed from a tube split lengthwise and rolled up double ply, with its margins provided with paste as indicated at P. During unwinding, this roll A engages the table 42 and assumes the shape approximately of that designated B, after which it reaches substantially flat form C, and then advances around the sand covered roller 47 and is wound up into the spread and rolled form D.

During winding into the form D, the cloth is measured by means of a measuring wheel 62 driven by a gear 63 on the shaft 57.

It is to be understood that the invention is not confined to the exact details of construction set forth, as it is obvious that various alterations and modifications will suggest themselves to those skilled in the art without departing from the scope of the appended claims.

Having thus described my invention, what I claim and desire to protect by Letters Patent is:

1. An apparatus for making a strip of knit goods from a tube thereof, comprising means for continuously advancing the tube, a paste wheel for applying to said tube a lengthwise stripe of paste, means for drying the paste as the tube advances, an endless belt having means adapted to engage said fabric to guide the same during advance of the tube, and a knife remote from said paste wheel for slitting the goods along the dried stripe.

2. The combination with an apparatus for continuously advancing a tube of knit goods in the direction of its length and including a drying pipe around which the goods is disposed, of means for applying a stripe of paste lengthwise of the tube, means for slitting the tube intermediate the stripe, and means cooperating with said drying pipe to smooth the advancing tube before reaching the paste applying means.

3. The combination with an apparatus for continuously advancing a tube of knit goods in the direction of its length and including a drying pipe around which the goods is disposed, of means for applying a stripe of paste lengthwise of the tube, means for slitting the tube intermediate the stripe, and a plurality of adjustable smoothers adapted to yieldingly engage said goods around said drying pipe in advance of the paste applying means.

4. The combination with an apparatus for continuously advancing a tube of knit goods in the direction of its length and including a drying pipe around which the goods is disposed, of means for applying a stripe of paste lengthwise of the tube, means for slitting the tube intermediate the stripe, a plurality of supports, and an inflated rubber tube adjustably carried by each of the supports and arranged to engage the goods around said pipe in advance of the paste applying means, the rubber tubes being of arcuate formation and conforming substantially to the curvature of said pipe.

5. An apparatus for making a strip of knit goods from a tube thereof, comprising in combination a vertical drying cage over which the tube is continuously advanced, a drier pipe stationed within said tube at the base of the drying cage and adapted to supply a draft of heated air through the interior of the tube as it passes over the drying cage, means for applying paste to a portion of the diameter of said tube whereby to form thereon a stripe of paste lengthwise of the tube, and a knife remote from the paste applying means for slitting the tube intermediate the stripe of paste after the same has been dried, whereby to insure clean cut and non-ravelling edges.

6. The combination with a vertical drier cage and a heating pipe for supplying a blast of heated air to the interior of tubular knit goods continuously advanced upwardly over the cage, of an attachment for applying a stripe of paste lengthwise of the tube and slitting the tube intermediate the stripe, comprising a paste wheel adjacent the lower portion of said vertical cage and arranged in contact with the tube to apply paste lengthwise thereof in the form of a stripe, and a knife adjacent the upper extremity of the cage adapted to slit the tube intermediate the stripe of paste after drying on the cage.

7. The combination with a vertical drying cage and a heating pipe for supplying a blast of heated air to the interior of an advancing length of tubular knit goods drawn upwardly over the drying cage and the heating pipe, of an attachment for splitting the tube lengthwise to form a strip and to provide non-ravelling edges, comprising a paste applying wheel adjacent the lower portion of the drying cage on the outside of the tube, a backing wheel on the inside of the tube against which said paste supplying wheel presses to apply paste to the advancing tube in the form of a lengthwise stripe, and a knife adjacent the upper extremity of the drying cage arranged to slit the said tube intermediate the stripe of paste.

8. The combination with a vertical drying cage and a heating pipe for supplying a blast of heated air to the interior of an advancing length of tubular knit goods drawn upwardly over the drying cage and the heating pipe, of an attachment for splitting the tube lengthwise to form a strip and to provide non-ravelling edges, comprising a paste applying wheel adjacent the lower portion of the drying cage on the outside of the tube, a backing wheel on the inside of the tube against which said paste supplying wheel presses to apply paste to the advancing tube in the form of a lengthwise stripe, a knife adjacent the upper extremity of the drying cage arranged to slit the said tube intermediate the stripe of paste, and means for smoothing said tube in advance of the paste applying wheel.

CHARLES A. SHIPPLING.